UNITED STATES PATENT OFFICE.

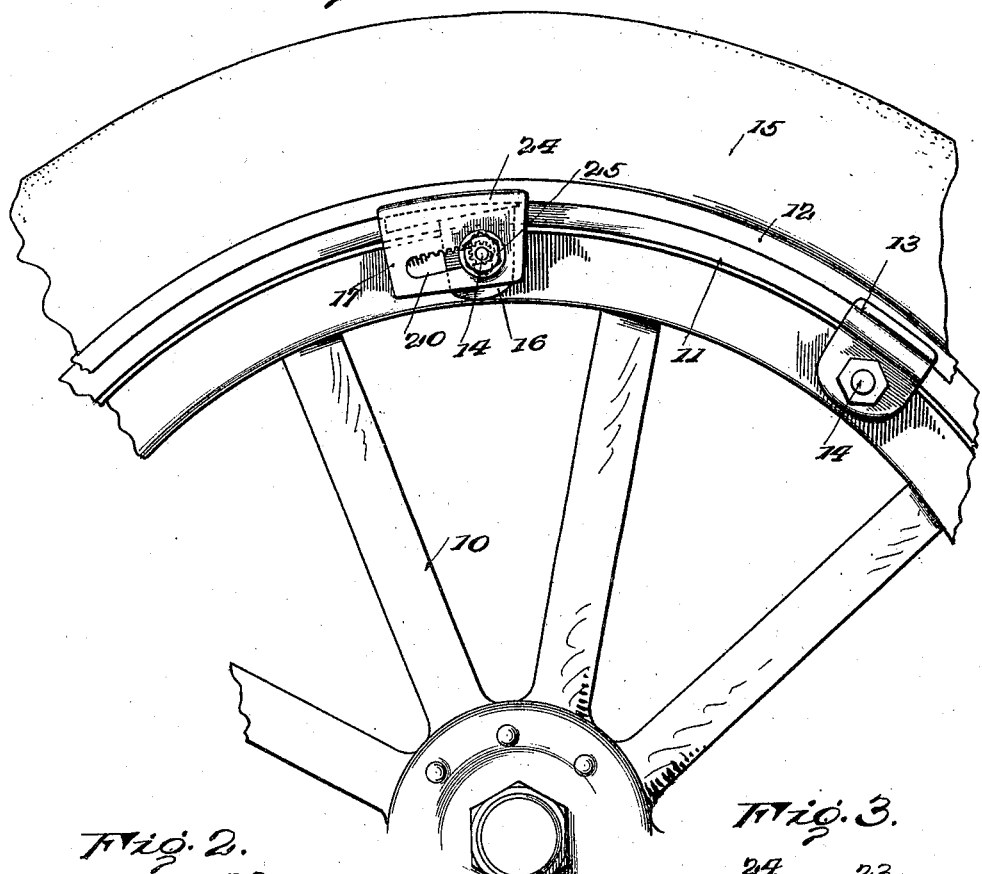

JAMES F. ENGLAND, OF LEBANON, MISSOURI.

EXPANDING DEVICE FOR WHEEL-RIMS.

1,399,012.  Specification of Letters Patent.  Patented Dec. 6, 1921.

Application filed July 30, 1920. Serial No. 399,988.

*To all whom it may concern:*

Be it known that I, JAMES F. ENGLAND, citizen of the United States, residing at Lebanon, in the county of Laclede and State of Missouri, have invented certain new and useful Improvements in Expanding Devices for Wheel-Rims, of which the following is a specification.

This invention relates to an improved distorting device for motor vehicle wheel rims and has as one of its principal objects to provide a device of this character whereby a rim and its side clamps may be caused to tightly coact so as to firmly secure the rim upon a wheel.

The invention has as a further object to provide a device which, after the rim clamps have become worn, may be operated for taking up the resultant looseness between the clamps and the rim.

And the invention has as a still further object to provide a device which may be readily employed in connection with substantially any conventional design of motor vehicle wheel and rim.

Other and incidental objects will appear hereinafter.

In the drawings:

Figure 1 is a fragmentary side elevation showing my improved device in connection with a motor vehicle wheel and rim of conventional design, a pneumatic tire of ordinary construction being shown upon the rim, Fig. 2 is a front elevation showing the device detached, Fig. 3 is a rear elevation of the device, Fig. 4 is a fragmentary vertical sectional view more particularly illustrating the manner in which the device is formed to enter between the wheel and the demountable rim of the wheel, and Fig. 5 is a perspective view showing the operating nut of the device in detail.

In order that the construction, mounting and operation of my improved device may be accurately understood I have, in the drawings, shown the device in connection with a motor vehicle wheel 10 of conventional design. The felly band of the wheel is indicated at 11. I have illustrated the wheel as equipped with a demountable rim 12 of ordinary construction and, as is usual, this rim is held by a plurality of clamps 13 which are secured by bolts 14 extending through the wheel felly. A pneumatic tire 15 of conventional design is shown upon the rim 12. As is well known, continued use produces considerable wear in the side clamps 13 and it often becomes impossible, due to such wear, to bind the rim 12 upon the wheel with the desired firmness since the clamps can be advanced between the felly band and the demountable rim only a predetermined distance. The present invention, therefore, seeks to provide a device whereby, even though the rim clamps have become worn, as just indicated, the demountable rim may, nevertheless, be caused to coact with said clamps and thus securely fixed upon the wheel.

In carrying the invention into effect, I employ companion distorting members 16 and 17 respectively. The member 16 is provided with a medial vertical slot 18 for freely receiving, as particularly shown in Fig. 4, one of the bolts 14 of the wheel felly therethrough and is arranged to seat flat against the outer side edge of the felly. Formed on said plate at its upper end is a laterally directed wedge lug 19 overhanging the felly and seating flat against the peripheral face of the felly band 11. The member 17 is formed to overlie the member 16 and is provided with a longitudinally directed inclined slot 20 enlarged at one end as shown at 21, and provided at its upper edge with a rack 22. Extending from the member to overlie the wedge lug 19 is a wedge lug 23 provided at its lower side with an inclined face to coact with the upper inclined face of the lug 19 while, at its upper side, the lug 23 is formed with a curved face to fit beneath the rim 12. At its upper margin, the member 17 provides a flange 24 lying at substantially right angles to the lug 23 and confronting the rim 12 at its outer side edge. As will be observed, the slot 20 is so arranged that the felly bolt extends medially therethrough and threaded upon said bolt is an adjusting nut 25. This nut is provided with an annular flange 26 which seats against the outer side of the member 17 and arranged axially of the nut at the inner side of said flange is a pinion 27 received within the slot 20 to coact with the rack 22. From the inner side of the pinion extends a reduced nipple 28 which is freely received within the slot 18 of the expanding member 16.

In the practical use of my improved device, the rim 12 is first fitted upon the wheel in the usual manner when all of the clamps 13 are, with the exception of one, then applied and tightened into engagement with the rim. This done, one of the bolts 14 will remain for receiving the device. The member 16 is first rested against the wheel felly as suggested in Fig. 4, when the member 17 is then applied over the member 16 and so arranged that the felly bolt is received through the enlarged portion 21 of the slot 20 of said member. The enlarged portion of this slot is designed to freely receive the pinion 27 of the nut 25. Consequently, the nut may be applied upon the bolt and partially adjusted thereon for seating the member 17 against the member 16 and bringing the flange 24 of the member 17 into engagement with the rim 12. Then, by tapping the member 17 laterally until the rack 22 thereof is brought to position for coaction with the rack 27, the nut 25 may be further adjusted for shifting the member 17 laterally upon the member 16 and at the same time binding the flange 24 against the rim. As will be perceived, lateral movement of the member 17 will serve to advance the wedge lug 23 thereof over the wedge lug 19 of the member 16 so that the member 17 will be shifted radially outward. Consequently, the lug 23 of the member 17 will be caused to wedge between the inner face of the rim 12 and the lug 19 of the member 16 for distorting the rim and consequently causing said rim to bind against the rim clamps 13. Accordingly, the clamps will then serve to firmly secure the rim upon the wheel. At the same time, the member 17 will itself serve as a clamp acting to hold the adjacent portion of the rim against lateral movement. I accordingly provide an effective device for the purpose set forth and a device which, as will now be readily observed, may be readily employed in connection with motor vehicle wheels and demountable rims of substantially any conventional design. In this connection it is to be noted that while I have indicated that the device is employed in lieu of one of the ordinary rim clamps of a wheel, still, as will be readily appreciated, a bolt similar to the bolts 14 may be provided for engagement through a wheel felly so that the device may be employed in conjunction with the full complement of rim clamps of the wheel.

Having thus described the invention, what is claimed as new is:

1. A device of the character described including companion expanding members having coacting inclined faces and provided with registering slots for receiving a bolt therethrough, the slot of one of said members being provided with a rack, and a nut adjustable upon said bolt and having a pinion to coact with said rack whereby as the nut is rotated, one of said members will be elevated upon the other.

2. The combination with a wheel, a rim removably fitting thereon, and means securing the rim upon the wheel including a bolt projecting from the wheel felly, of means between the felly and rim operable to distort the rim, and a nut rotatable upon the bolt and having means having rolling engagement with the first means for actuating the first means.

3. The combination with a wheel, a rim removably fitting thereon, and means securing the rim upon the wheel felly, of coacting distorting members between the felly and rim, and a nut having means coacting with one of said members and rotatable upon the bolt for shifting such member relative to another of said members circumferentially of the wheel to distort the rim.

4. The combination with a wheel, a rim removably fitting thereon, and means securing the rim upon the wheel including a bolt projecting from the wheel felly, of a distorting member having a lug lying between the felly and rim and provided with an inclined face, a companion distorting member having a lug overlying the lug of the first member and having an inclined face to coact with the inclined face of the first lug, and a nut rotatable upon the bolt and having means coacting with the latter member for shifting the latter member relative to the first member when the nut is rotated whereby to distort the rim.

5. The combination with a wheel and a rim removably fitting thereon, of coacting distorting means lying between the felly and rim, and rotatable means having rolling engagement with one of the first means and operable for shifting such one of the first means circumferentially of the felly to distort the rim.

In testimony whereof I affix my signature.

JAMES F. ENGLAND. [L. S.]